(12) United States Patent
Klosowski et al.

(10) Patent No.: US 6,432,553 B1
(45) Date of Patent: Aug. 13, 2002

US006432553B1

(54) METHOD OF CONSERVING WATERLOGGED MATERIALS

(75) Inventors: Jerome Melvin Klosowski, Bay City, MI (US); Charles Wayne Smith; Donny Leon Hamilton, both of Bryan, TX (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/327,358

(22) Filed: Jun. 7, 1999

Related U.S. Application Data

(62) Division of application No. 09/084,279, filed on May 26, 1998, now Pat. No. 6,020,027, which is a division of application No. 08/780,499, filed on Jan. 8, 1997, now Pat. No. 5,789,087.

(51) Int. Cl.⁷ .............................. B05D 3/10; B05D 7/06; B32B 21/04
(52) U.S. Cl. .................... 428/541; 428/537.1; 427/297; 427/340; 427/351; 427/393; 427/387; 427/440
(58) Field of Search .................................. 427/297, 351, 427/408, 393, 440, 340, 387; 428/537.1, 541

(56) References Cited

U.S. PATENT DOCUMENTS

| | | | | |
|---|---|---|---|---|
| 3,166,434 A | | 1/1965 | Gauger, Jr. .................. | 427/317 |
| 4,069,378 A | | 1/1978 | DeMarco ..................... | 526/328 |
| 4,291,101 A | | 9/1981 | Tanizaki et al. ............. | 428/514 |
| 4,304,820 A | * | 12/1981 | Deubzer et al. ............. | 428/452 |
| 4,318,766 A | | 3/1982 | Smith .......................... | 156/330 |
| 4,343,840 A | | 8/1982 | Edwards et al. ............ | 427/351 |
| 4,386,134 A | * | 5/1983 | Puhringer ................... | 428/447 |
| 4,423,112 A | | 12/1983 | Luthringshauser et al. . | 428/389 |
| 4,480,072 A | | 10/1984 | Mallon ........................ | 525/61 |
| 4,908,238 A | | 3/1990 | Vigo et al. .................. | 427/389 |
| 5,534,305 A | | 7/1996 | Fujiki et al. ................. | 427/393 |
| 5,789,087 A | * | 8/1998 | Klosowski et al. ....... | 428/537.1 |
| 6,022,589 A | * | 2/2000 | Klosowski et al. ......... | 427/297 |

* cited by examiner

*Primary Examiner*—Michael Barr
(74) *Attorney, Agent, or Firm*—Robert L. McKellar; Timothy J. Troy; Jennifer S. Warren

(57) ABSTRACT

A method of preserving waterlogged materials and more specifically, preserving artifacts that have been submerged in water for long periods of time. A method of treating waterlogged materials that have been subjected to preservation techniques using polyethylene glycol as the preservative, and a method of restoring such materials from the deleterious effects of the glycol.

17 Claims, No Drawings

METHOD OF CONSERVING WATERLOGGED MATERIALS

This application is a division of U.S. patent application Ser. No. 09/084,279, filed May 26, 1998, now U.S. Pat. No. 6,020,027, which is a division application of Ser. No. 08/780,499, filed Jan. 8, 1997 now U.S. Pat. No. 5,789,087.

FIELD OF THE INVENTION

This invention deals with a method of preserving waterlogged materials and more specifically, this invention deals with preserving artifacts that have been submerged in water for long periods of time and further, this invention deals with waterlogged materials that has been subjected to preservation techniques using polyethylene glycol as the preservative, and a method of restoring such materials from the deleterious effects of the glycol.

BACKGROUND OF THE INVENTION

The field of conservation of artifacts has drawn considerable interest in the past few years and such conservation practices have been utilized to preserve archaeological materials. The chief concern in conserving these materials is to bulk up the cell wall structure of the waterlogged materials by introducing compounds that replace water in the damaged structure of the material. Allowing waterlogged wood to dry out without replacing the water with a bulking agent results in warping and excessive shrinkage, sometimes leading to total destruction of the wooden artifact.

Because the preserved wood needs to retain original coloration, have dimensional stability and integrity, one must be careful of the technique used to maintain these properties.

Prior art methods have used a variety of materials for preservation, namely, polyethylene glycol, acrylic resins and sugar.

For example, it is well-known in the field to use polyethylene glycols as conservation materials, especially in wood substrates. However, the materials so treated have a finite conservation time and one of the objectives of the instant invention is to prolong the conservation/preservation time of such substrates. For example, one of the inventors herein had acquired some wooden tongue depressors made out of birch wood, that had undergone controlled degradation and conservation using a variety of molecular weights of polyethylene glycol. It should be noted that polyethylene glycol has many physical forms and that the higher molecular weights are preferred for conservation. Such higher molecular weights are normally solid materials. However, after nearly ten years of preservation, the tongue depressors discussed supra showed signs of surface pooling and excessive flexibility that suggest that the polyethylene glycol was in a semi-liquid form and that the polyethylene glycol used to preserve the wood had de-stabilized, which eventually leads to instability of the preserved wood. In most cases, the coloration of the wood samples was translucent and unnatural in appearance. In some cases, the tongue depressors maintained a wet appearance as well as a general heightened degree of flexibility that exceeded the range of flexibility noted in the control samples.

Each of the above mentioned materials have their inherent benefits, but they also have their inherent disadvantages, such as in the case of the polyethylene glycol.

Because museums around the world have used a wide range of molecular weights of polyethylene glycol as bulking agents to conserve waterlogged and deteriorated wooden artifacts, and because polyethylene glycol treated artifacts require controlled curation, new means of stabilizing this bulking agent are necessary to ensure the long term survival of treated artifacts.

Further, some of these methods require a post heating step and high temperatures to complete the process and the wide variability in temperatures and high humidity can cause wood samples treated by polyethylene glycol and/or sugar to weep, resulting in pooled liquids on their surfaces such as that suggested supra. Thus, highly controlled storage of wood treated by these processes is essential for long term survival of the artifact.

Unfortunately, a great deal of wood recovered in the past from many archaeological sites was either ignored or discarded because conservation processes were either too costly or ineffective to guarantee results.

"Waterlogged" wood is employed herein as a reference to the wood whose water content is above its fibre saturation point, that is, when all of the sites available for hydrogen bonding are no longer available. Typically, this wood has undergone biological decay with chemical and physical changes inherent.

Under waterlogged conditions, water is in itself a conservation agent for the wood. It acts as the bulking agent, helping the wood to retain its shape and some degree of integrity. When waterlogged wood is allowed to dry, it suffers severe dimensional changes due to the collapse of the cell cavities and shrinkage of the cell walls.

Thus, waterlogged wood conservation has as its main objective, the avoidance of shrinking and deformation of the wooden artifacts without commensurate loss of aesthetics of the artifact.

Polyethylene glycol conservation of wood has been on-going since about the 1940's when the potential for treating waterlogged wood was first discovered. Polyethylene glycols are polymeric ethylene oxides that are currently commercially available from a number of manufacturers. They range in physical appearance from liquids to semi-solid waxes, to hard, wax-like solids. Typically, polyethylene glycol conservation is carried out in a batch process wherein the polyethylene glycol, having an average molecular weight of about 4000 is diluted with water and some sort of biocide. The wooden artifacts are immersed in this liquid, and heat is applied (generally less than 100° C.) to evaporate water and facilitate penetration of the polyethylene glycol/biocide combination. It is known that the appropriate molecular weight of the polyethylene glycol to use is a function of the degree of deterioration of the wood being treated. Lower molecular weights are advised for relatively sound wood and higher molecular weights for wood badly deteriorated.

Some methods require that the wood have its initial bulking water displaced by using water soluble or water miscible solvents, followed by the use of the polyethylene glycol dilute solutions.

THE INVENTION

The invention disclosed and claimed herein deals with a method of conservation of wood substrates, especially wooden artifacts that have been immersed in water for long periods of time. Such a method comprises (I) impregnating a wooden substrate with a polyoxyethylene polymer or a mixture of polyoxyethylene polymers having an average of at least two carbinol groups per molecule and thereafter, (II) impregnating the product of (I) with sufficient crosslinker or a mixture of crosslinkers to crosslink a significant portion of the polyoxyethylene polymer or mixture of polyoxyethylene polymers of (I). and thereafter, (III) exposing the product of (II) to a catalyst or a mixture of catalysts for a time sufficient to initiate curing of the product of (II). The process of impregnating the wooden substrate in this or any of the following embodiments of the invention may be assisted by positive or negative pressure.

Another embodiment of this invention is one in which the wooden substrates, which already contain polyoxyethylene polymers, can be preserved. Thus, there is provided a method of preserving wooden substrates that contain polyoxyethylene polymers, the method comprising: (I) impregnating the wooden substrate containing the polyoxyethylene polymer with sufficient crosslinker or a mixture of crosslinkers to crosslink a significant portion of the polyoxyethylene polymer or mixture of polyoxyethylene polymers, and thereafter, (II) exposing the product of (I) to a catalyst or a mixture of catalysts for a time sufficient to initiate curing of the product of (I).

There is yet another method of preserving wooden substrates that contain polyoxyethylene polymer, the method comprising (I) impregnating a wooden substrate with a cyclosiloxane or a mixture of cyclosiloxanes having an average of at least two silane hydrogens per molecule thereby displacing essentially all of the polyoxyethylene polymer from the wooden substrate, and thereafter, (II) exposing the product of (I) to a catalyst or a mixture of catalysts for a time sufficient to initiate curing of the product of (I). The cyclosiloxane or mixture of cyclosiloxanes may include, for instance, cyclic trimers, cyclic tetramers, or cyclic pentamers of siloxane.

Still another embodiment of this invention is a method comprising (I) impregnating a wooden substrate with a hydrolyzable silane or a mixture of hydrolyzable silanes thereby displacing a portion or essentially all of the polyoxyethylene polymer from the wooden substrate and thereafter, (II) exposing the product of (I) to a catalyst or a mixture of catalysts for a time sufficient to initiate curing of the product of (I).

There is yet another method of preserving wooden substrates that contain polyoxyethylene polymer, the method comprising (I) impregnating a wooden substrate with a cyclosiloxane or a mixture of cyclosiloxanes having an average of at least two silane hydrogens per molecule thereby displacing essentially all of the polyoxyethylene polymer from the wooden substrate, and thereafter, (II) exposing the product of (I) to a catalyst or a mixture of catalysts for a time sufficient to initiate curing of the product of (I).

There is yet another method of preserving wooden substrates that contain polyoxyethylene polymer. the method comprising (I) impregnating a wooden substrate, displacing essentially all of the polyoxyethylene polymer from the wooden substrate with at linear siloxane or a mixture of linear siloxanes having a molecular weight of 10,000 g/mol or less, and having an average of at least two silane hydrogens per molecule, and optionally mixed with a cyclosiloxane or a mixture of cyclosiloxanes having an average of at least two silane hydrogens per molecule. and thereafter (II) exposing the product of (I) to a catalyst or mixture of catalysts for a time sufficient to initiate curing of the product of (I).

EXAMPLE 1
Crosslinking Systems Using Polyethylene Glycol

Several combinations of crosslinking agents and catalysts were evaluated for the purposes of determining if polyethylene glycol could be conveniently crosslinked under the conditions used for the conservation of wooden artifacts.

In an attempt to duplicate the bulking of waterlogged wooden timbers from ships which were bulked using polyethylene glycol, a solution of PEG 3350 (polyethylene glycol having a molecular weight of approximately 3350 g/mole) was prepared by placing a jar of water into a warming oven which was maintained at 158° F. Ten, ten gram portions of the polyethylene glycol were slowly added to the water to give a solution of approximately 50 weight percent of polyethylene glycol.

Several hundred birch wood tongue depressors were placed in a four liter stainless steel beaker and immersed in water. Mesh screen and a heavy weight were placed on top of the tongue depressors in solution to prevent them from floating during waterlogging processing. The wood, while still in solution was then placed on a warmer plate and heated to a temperature of 110° F. for eight hours per day for ten days. After the tenth day, the water was changed to fresh water and then the tongue depressors were removed from the hot plate and stored in fresh water at room temperature in a sealed jar. Samples of these woods were allowed to air dry at room temperature to determine if the structural integrity of the samples had been compromised. After twenty four hours, extensive warpage and shrinkage of all of the samples suggested that the tongue depressors has been sufficiently waterlogged for purposes of the testing.

Twenty samples were selected and placed into a large jar of fresh water. This jar was then stored in a vented warming oven which was maintained at a temperature of about 158° F. Ten weight percent increments of 3350 powder were added to this water to form a solution, until 14 increments had been added, which resulted in a 58 weight percent PEG solution.

A single tongue depressor was removed from the PEG solution and surface wiped with paper towel to remove free-flowing PEG solution from all of its surfaces. This sample was dark brown in color. This tongue depressor was sample 1. This sample was placed into a graduated glass cylinder containing 50 milliliters of fresh methyltrimethoxysilane (MTM) A loose fitting cap was placed over the top of the cylinder and then the tongue depressor in solution was placed into the vented warming oven. The sample remained in the methyltrimethoxysilane in the oven for a period of 24 hours and then it was removed from the oven and allowed to stand in the solution at room temperature for 5 hours. The tongue depressor was then removed from the MTM solution and lightly surface wiped with paper towel.

The detailed apparatus and procedure were as follows. Each of the prepared samples when treated, was placed in an individual containment chamber made of a one quart jar with a tight fitting lid. In an inverted position, the lid of the unit formed a base, while the body of the jar formed a removable lid for the unit. An aluminum tray was used for the catalyst and this try was placed in the center of the base and held in position with a small piece of double sided tape. A small section of expanded aluminum mesh, approximately 1.75 inches square, was placed over the top of the catalyst tray. The edges of the mesh were then bent over, tightly securing the mesh to the tray. Small knife slits were made on the top surfaces of the containment chamber lids as a means of preventing pressurization within the chambers during the treatment.

One and one half ounces of the catalyst of choice was placed into the tray and then the sample was placed into its respective containment chambers resting on the mesh. In this position, the sample was placed directly over the top of the tray. Several small pieces of paper towel were placed on top of the screen before the waterlogged tongue depressor was placed in the unit to absorb free flowing PEG that otherwise might contaminate the catalyst. With the containment chamber lid firmly in place, the containment chamber was placed into a vented warming oven that was maintained at about 160° F. to create a catalyst vapor in the chamber. In the case of sample 1, dibutyltindilaurate was used. All samples, unless noted otherwise, were left in the catalyst vapor deposition for twenty four hours.

At the end of the treatment, each containment chamber was removed from the oven and carefully opened in a vented fume hood.

The sample 1 was light gray to brown in color. The edges of the tongue depressor appeared to be somewhat translucent and generally, the surfaces of the sample felt waxy and smooth to the touch. There was no shrinkage, even after several weeks of exposure to air. The sample had not warped or changed structurally.

EXAMPLE 2

Two tongue depressors that had been initially treated to waterlog them were treated as in the method used in example 1 except that the catalyst was tetraisopropyltitanate. These samples, designated 2 and 3 had essentially the same appearance as sample 1.

EXAMPLE 3

A tongue depressor that had been initially treated to water log it was treated as in the method used in example 1, except that the catalyst was tin octoate. This sample was sample 4 and it had essentially the same appearance as the previous samples.

EXAMPLE 4

Another treated tongue depressor was treated with MTM as above, and the only exception was that the sample was treated for six hours instead of 24 hours. This sample was sample 5 and it had essentially the same appearance as the previous samples.

EXAMPLE 5

A treated tongue depressor was treated with MTM as above, and the only exception was that the sample was treated using MTM in which 3 weight percent dibutyltindilaurate had been added.

The results of this testing can be found on TABLE I below.

TABLE I

| SAMPLE | RESULTS |
| --- | --- |
| 1 | slightly browner in color than non-treated no warpage, slight swelling |
| 2 | essentially same color as non-treated no warpage, slight swelling |
| 3 | good color, slight swelling |
| 4 | gray-brown color, slight swelling |
| 5 | slightly gray-brown slight swelling |

EXAMPLE 6

Using gloves and a hot air gun, a water logged tongue depressor was slowly warmed. The side surface of a one pint tin can was also warmed with the air gun and while both the tongue depressor and can were still hot, the tongue depressor was wrapped around the side of the can and held in place until the can and tongue depressor had returned to room temperature, about 20 minutes. Rubber bands were then stretched around the tongue depressor and tin can and positioned so that they held the tongue depressor in its wrapped position against the side of the can. The tongue depressor wrapped can was then placed in a 5 quart can and a weight was placed on top of the one pint can to prevent it from floating. Approximately 1 liter of MTM was poured into the 5 quart can so that the tongue depressor, which was wrapped on the side of the small can was submerged in the MTM. Once a loose fitting lid was positioned on top of the larger outer vessel, the unit was placed into a vented warming oven set at about 160° F., and left in the treatment mode for about 4 hours. The entire unit was then removed from the oven, and once moved to a vented fume hood, the small can and tongue depressor were removed from the warm MTM solution.

Still wrapped on the small can, the tongue depressor was then placed into a large containment chamber resting on expanded aluminum mesh, over a catalyst tray containing three ounces of dibutyltindilaurate. With the lid of the containment chamber in position, the unit was placed into a vented warming oven for approximately eighteen hours. The sample in its containment chamber was then removed from the oven and opened in a vented fume hood. The rubber bands were removed and the semi-circle shaped tongue depressor slid easily from the side of the tin can.

The tongue depressor curved figure was traced on a piece of paper in order to track any unlocking of the configuration. Over a period of time, the tongue depressor configuration has changed very little.

EXAMPLE 7

Six waterlogged tongue depressors were randomly selected and immediately place into one liter of fresh acetone and placed in a freezer mounted vacuum chamber (FMVC) and processed for 24 hours under vacuum to remove the water in the wood. After the water/acetone displacement, the samples were then placed into a container with 1 liter of hydroxy end-blocked polydimethylsiloxane having a molecular weight of about 7600 g/mole and containing about 3 weight percent MTM. The samples were weighted down in the solution. The container with the samples was placed into a freezer for FMVC treatment. A vacuum was applied to the samples in solution for 24 hours. Afterwards, the container containing the tongue depressors was removed from the freezer and the tongue depressors were removed from the polydimethylsiloxane and lightly wiped with paper towel to remove free-flowing siloxane from the surfaces of the tongue depressors.

The tongue depressors were then placed into a one quart jar as a closed containment chamber system for catalyst vapor deposition. In the center of the base of the containment chamber was placed the aluminum tray and it was fastened in place using a small piece of double sided tape. Small pieces of paper towel were piled on the screen to prevent any free-flowing siloxane from dripping into the catalyst tray.

Twenty grams of dibutyltindilaurate were placed in the catalyst tray and the chamber was placed in position and the entire unit was placed into a vented warming oven maintained at about 160° F. The samples were left for sixty hours.

Upon removal from the system and upon evaluation of the samples, it was noted that they were slightly rubbery in texture and two of the six had shrunk slightly.

Microscopic analysis of thin sections of a tongue depressor indicated that generally, all of the cells of the wood contained cured polysiloxane.

What is claimed is:

1. A method of conservation of wooden substrates that contain polyoxyethylene polymers, the method comprising:
   (I) impregnating a wooden substrate with a hydrolyzable silane or a mixture of hydrolyzable silanes thereby displacing a portion or essentially all of the polyoxyethylene polymer from the wooden substrate and thereafter,
   (II) exposing the product of (I) to a catalyst or a mixture of catalysts for a time sufficient to initiate curing of the product of (I).

2. A method as claimed in claim 1 wherein the impregnation of (I) is assisted by negative pressure.

3. A method as claimed in claim 1 wherein the impregnation of (I) is assisted by positive pressure.

4. A method of conservation of wooden substrates that contain polyoxyethylene polymers, the method comprising:
   (I) impregnating a wooden substrate with a cyclosiloxane or a mixture of cyclosiloxanes having an average of at least two silane hydrogens per molecule thereby displacing essentially all of the polyoxyethylene polymer from the wooden substrate, and thereafter,
   (II) exposing the product of (I) to a catalyst or a mixture of catalysts for a time sufficient to initiate curing of the product of (I).

5. A method as claimed in claim 4 in which the cyclosiloxane is a cyclic trimer siloxane.

6. A method as claimed in claim 4 in which the cyclosiloxane is a cyclic tetramer siloxane.

7. A method as claimed in claim 4 in which the cyclosiloxane is a cyclic pentamer siloxane.

8. A method as claimed in claim 4 in which the cyclosiloxane is a mixture of cyclosiloxanes.

9. A method as claimed in claim 4 wherein the impregnation of (I) is assisted by negative pressure.

10. A method as claimed in claim 4 wherein the impregnation of (I) is assisted by positive pressure.

11. A method of conservation of wooden substrates that contain polyoxyethylene polymers, the method comprising:
    (I) impregnating a wooden substrate with a non-cyclic siloxane or a mixture of non-cyclic siloxanes having an average of at least two silane hydrogens per molecule and having a molecular weight of 10,000 g/mole or less, thereby displacing essentially all of the polyoxyethylene polymer from the wooden substrate, and thereafter,
    (II) exposing the product of (I) to a catalyst or a mixture of catalysts for a time sufficient to initiate curing of the product of (I).

12. A method as claimed in claim 11 wherein the impregnation of (I) is assisted by negative pressure.

13. A method as claimed in claim 11 wherein the impregnation of (I) is assisted by positive pressure.

14. A method as claimed in claim 11 wherein there is additionally present cyclic siloxanes or a mixture of cyclic siloxanes having an average of at least two silane hydrogens per molecule.

15. A product when prepared by the method of claim 1, wherein the wooden substrate was waterlogged prior to containing polyoxyethylene polymer.

16. A product when prepared by the method of claim 4, wherein the wooden substrate was waterlogged prior to containing polyoxyethylene polymer.

17. A product when prepared by the method of claim 11, wherein the wooden substrate was waterlogged prior to containing polyoxyethylene polymer.

* * * * *